(12) United States Patent
De Atley et al.

(10) Patent No.: US 8,725,112 B2
(45) Date of Patent: May 13, 2014

(54) ACTIVATION SOLUTION

(75) Inventors: Dallas B. De Atley, San Francisco, CA (US); Jerrold V. Hauck, Windermere, FL (US); Muralidhar S. Vempaty, San Jose, CA (US); Onur E. Tackin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 13/246,813

(22) Filed: Sep. 27, 2011

(65) Prior Publication Data

US 2012/0309348 A1    Dec. 6, 2012

Related U.S. Application Data

(60) Provisional application No. 61/493,478, filed on Jun. 5, 2011.

(51) Int. Cl.
  *H04M 1/66* (2006.01)
  *H04M 1/68* (2006.01)
  *H04M 3/16* (2006.01)

(52) U.S. Cl.
  USPC ........... 455/410; 455/409; 455/411; 455/423; 455/424; 455/425; 455/435.1; 455/435.3; 370/310.2; 370/324; 370/328; 380/255; 380/277

(58) Field of Classification Search
  USPC ............... 713/409–411, 423–425, 435.1, 0.3; 370/310.2, 324, 328; 380/255, 277
  See application file for complete search history.

(56) References Cited

U.S. PATENT DOCUMENTS

| | | | |
|---|---|---|---|
| 6,014,561 A * | 1/2000 | Molne | 455/419 |
| 6,591,098 B1 * | 7/2003 | Shieh et al. | 455/419 |
| 7,940,932 B2 | 5/2011 | Paksoy et al. | |
| 2008/0003980 A1 | 1/2008 | Voss et al. | |
| 2008/0167036 A1 | 7/2008 | Bush et al. | |
| 2008/0318550 A1 | 12/2008 | DeAtley | |
| 2009/0181662 A1 | 7/2009 | Fleischman et al. | |

FOREIGN PATENT DOCUMENTS

| | | |
|---|---|---|
| EP | 2079256 A1 | 7/2009 |
| WO | WO 2009/029155 A1 | 3/2009 |

OTHER PUBLICATIONS

PCT Search Report and Written Opinion of the International Searching Authority for PCT/US2012/038289, mailed Jul. 30, 2012.

* cited by examiner

*Primary Examiner* — Steve D Agosta
(74) *Attorney, Agent, or Firm* — Blakely, Sokoloff, Taylor & Zafman LLP (57) ABSTRACT

To securely factory activate a mobile device according to authorized records, factory activation server generates and sends a signed factory activation record including a signed factory activation ticket. Signed factory activation record and ticket are cryptographically signed using factory private key stored in factory activation server. Factory private key is different from customer private key stored in the activation server that provides activation tickets for customer activation. If factory activation record is valid, application processor (AP) included in the device performs factory activation of the device which includes AP activating to allow for factory testing and rebooting at a predetermined reboot time. Wireless communication processor (BB) included in the device verifies the factory activation ticket and if valid, BB performs factory activation including: BB registering to a cellular telephone communications network for factory testing, and unregistering from the network after a predetermined unregistering time. Other embodiments are also described.

22 Claims, 4 Drawing Sheets

ACTIVATION SOLUTION

CROSS-REFERENCE TO RELATED APPLICATIONS

This application claims the benefit pursuant to 35 U.S.C. 119(e) of U.S. Provisional Application No. 61/493,478, filed Jun. 5, 2011, which application is specifically incorporated herein, in its entirety, by reference.

FIELD

Embodiments of the invention relate generally to methods, apparatuses and systems for securely factory activating a mobile device.

BACKGROUND

In general, a factory assembly line for mobile devices may include three main stations. In the first station, the motherboard is bootstrapped and tested to determine whether the basic components of the motherboard are functional. If motherboard is determined to function properly, the motherboard is then placed in an enclosure unit (e.g., a housing of a mobile device) and a set of test software is loaded thereon. The set of test software may be an internal version operating system (OS) with additional tools. The set of test software allows for further testing of the entire device as a complete unit. Once the testing is complete, the device enters the second station, the shipping settings station, where the actual customer's operating system (OS) is downloaded onto the device. The majority of the devices go through shipping settings station to the pack-out station where the devices are polished and placed in a box to be shipped to the customers. However, a small percentage of the devices are diverted to the third main station called the Outgoing Quality Control (OQC) station. At OQC station, this small percentage of devices act as a sample and are further tested to ensure that the devices being manufactured are functioning properly. However, the customer OS that is loaded onto the mobile device at the shipping settings station requires activation.

In the customer scenario, in order to activate the device, the customer is asked to connect the device to a host, which can establish communication between the device and an activation server. The activation server can determine whether to activate the device or walk the customer through the steps of obtaining a cellular telephone plan. The device may also be activated with additional information such as information that is used by fair play. Therefore, in the customer scenario, the activation occurs due to the communication between the activation server and the device before the customer can use their mobile device.

However, in the factory setting, at OQC stage, the device is not able to communicate with the activation server. Among other reasons, the device being tested at OQC cannot communicate with the activation server because the connection between the activation server and the factory is not sufficiently reliable to support the production rates that are needed at the factory. Additionally, for security purposes, it is not desirable to allow the factory environment to have access to the activation server, which may be within a corporate network. Thus, if the device cannot be activated, it follows that the device cannot be tested at OQC stage.

In the past, in order to test the device's telephony, a test SIM card was used which would indicate to the device to activate in order to allow for phone call type testing. However, this solution was not feasible for mobile devices that do not use a SIM card. Alternatively, during the shipping setting stage, the devices destined for OQC stage were loaded with a debug OS that indicated to the device to activate in a debug mode, which would allow for testing of the telephony to occur in OQC stage. However, the use of the debug OS for the OQC devices requires a fourth station in the factory line called a restore station. The restore station is needed to replace the debug OS with the customer OS prior to being sent to the pack-out station. Accordingly, the need for a restore station reduces the production rates of the factory line.

Therefore, there is a need to be able to efficiently activate the mobile device during testing in the factory while mitigating the potential harm of having an activated mobile device at a factory level.

SUMMARY

Methods, apparatuses and systems for securely factory activating a mobile device are described herein.

In one embodiment of the invention, the mobile device running the same software may perform factory activation as well as customer activation. Thus, in this embodiment, the factory testing is streamlined. In some embodiments, a method for securely factory activating the mobile device starts with the application processor included in the mobile device transmitting activation information to a factory activation server and the factory activation server generating a factory activation record, which may include a factory activation ticket based on the activation information. In some embodiments, the factory activation server then cryptographically signs the factory activation record and the factory activation ticket using a factory private key which stored in the factory activation server.

In some embodiments, the application processor then verifies the factory activation record received from the factory activation server using a factory public key. In some embodiments, if the factory activation record is verified to be valid, the application processor performs factory activation of the mobile device which includes the application processor activating to allow for factory testing and rebooting at a predetermined reboot time. In some embodiments, the predetermined reboot time corresponds to the minimum amount of time needed for the factory to test the application processor. In one embodiment, the predetermined reboot time is 8 hours. In other embodiments, the application processor may dynamically set the predetermined reboot time.

In some embodiments, the factory activation ticket is then transmitted from the application processor to the wireless communication processor included in the mobile device. The wireless communications processor, using the factory public key, verifies the factory activation ticket. In some embodiments, if the factory activation ticket is verified to be valid, the wireless communications processor performs factory activation which includes the wireless communication processor registering to a cellular telephone communications network for factory testing, and unregistering from the network after a predetermined unregistering time. In some embodiments, the predetermined unregistering time is the minimum amount of time that the factory requires test the wireless communications processor. In one embodiment, the predetermined unregistering time is 45 minutes. In other embodiments, the wireless communications processor may dynamically set the predetermined unregistering time.

In some embodiments, in the customer activation situation, the mobile device receives an activation ticket from an authentication server having a customer private key stored therein. The application processor performs customer activation upon verifying the activation record using a customer public key. The activation record may include an activation ticket. Similarly, the wireless communications processor performs customer activation upon verifying the activation ticket using the customer public key. In some embodiments, the authentication server is different from the factory activation server, the activation record is different from the factory activation record, the activation ticket is different from the factory activation ticket, the customer public key is different from the factory private key, and the customer private key is different from factory private key.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

The following description is the divided into three parts. Part I gives a brief overview of a networked system in which customer activation of a mobile device is implemented. Part II describes a networked system in which an embodiment of the invention may be implemented to securely factory activate the mobile device according to authorized records. Part III describes methods of securely factory activating a mobile device according to authorized records.

Part I. Brief Overview of a Networked System Authorizing Secure Customer Activation of a Mobile Device According to Activation Records FIG. 1 shows a block diagram illustrating one embodiment of a networked system 100 to authorize secure customer activation of a mobile device 101 according to authorized records.

Figure 1:
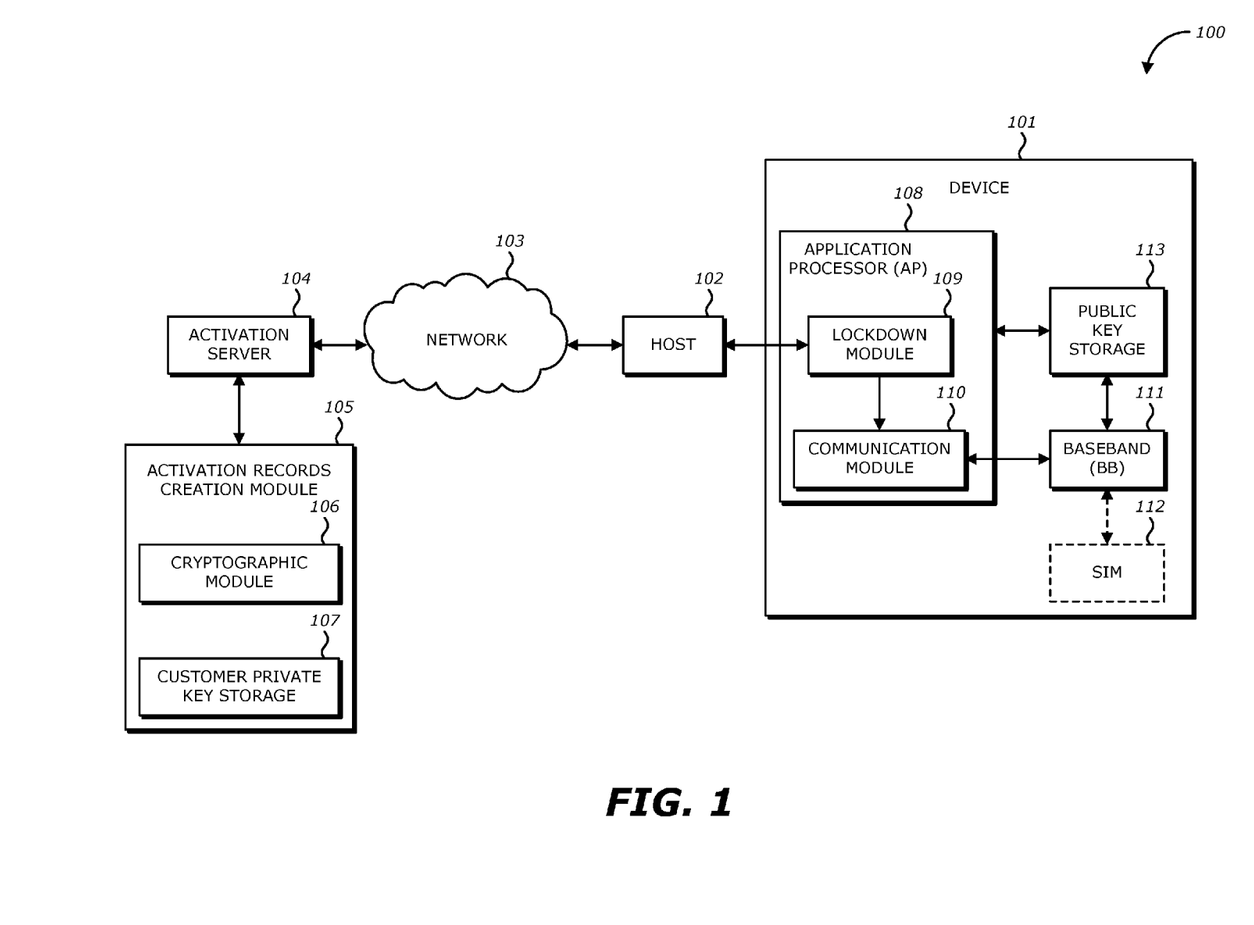
FIG. 1 shows a block diagram illustrating one embodiment of networked systems to securely activate a mobile device according to authorized records.

As illustrated in FIG. 1, networked system 100 may include a mobile device 101 coupled to a host 102 which, in turn, is coupled to an activation server 104 via trusted and/or untrusted networks 103. The network 103 may be physically located in a secure location to be trusted or may be trusted according to secure connections based on cryptographic protocols, e.g., SSL (Secure Socket Layer), PVN (Private Virtual Networking), or other connections.

For example, the device 101 may represent a Smart Phone such as an iPhone™ from Apple Inc. of Cupertino, Calif. and the host 102 may be iTunes™ from Apple Inc., which is locally coupled with the iPhone via a USB connection. The term "host" and the term "device," used herein, are intended to refer generally to data processing systems rather than specifically to a particular form factor for the host versus a form factor for the device.

In one embodiment, the device 101 includes a wireless communications processor (baseband (BB)) 111 and an application processor (AP) 108 communicatively coupled to each other via internal bus. The baseband 111 may be any kind of wireless processor, such as for example, cellular processor, a Wi-Fi processor, a Bluetooth processor, etc. Application processor 108 may be any kind of general-purpose processor.

As illustrated in FIG. 1, in one embodiment, the AP 108 includes lockdown module 109 and a communication mobile 110. The lockdown module 109 may communicate with the host 109 while the device 101 is not yet activated and thus, is locked. The lockdown module 109 may determine whether access to the device 101 is granted to the host 102. The communication module 110 may communicate with the baseband 111. In some embodiments, the baseband 111 may be coupled to a SIM card 112. However, in other embodiments, the device 101 may not require a SIM card 112.

In some embodiments, the AP 108 also includes a springboard (not illustrated) that communicates with the lockdown module 109. The springboard may be a module that enforces a lockout screen on the device 101 while the device 101 remains locked.

In order for the device 101 to be activated for the customer's use (Customer Activation), when the device 101 is first connected to the host 102, the host 102 requests the activation information of the device 101 from the lockdown module 109. In some embodiments, the activation information may include information on the device 101 such as, for example, the device's serial number and the device's baseband identifiers. The baseband identifiers include the IME1 (International Mobile Equipment Identifier) in GSM (Global System for Mobile Communication) networks and the MEID (Mobile Equipment Identifier) for CDMA Networks. In some embodiments, the baseband identifier may also include information such as the baseband's electronic serial number, public key hashes from the chain of trust, and SIM card identifiers such as a unique serial number (ICCID) and an internationally unique number of the mobile subscriber (IMSI). These elements are further discussed below. Further, the baseband identifier may include the activation state, which in this scenario would be the unactivated state. In some embodiments, once the host 102 receives this activation information, the host 102 then sends the activation information to the activation server 104.

According to some embodiments, based on the activation information received, the activation server 104 determines the market for which the device 101 is destined. The activation server 104 may store information regarding the destined markets and the devices thereon. In some embodiments, the activation server 104 sends a webpage that will guide the customer through setting up a user account.

In some embodiments, the activation server 104 communicates with an activation records creation module 105 to generate an activation record based on the activation information received from the host 102. In some embodiment, the activation records creation module 105 includes a cryptographic module 106 and a customer private key storage 107. The activation records creation module 105 may create the activation records. The cryptographic module 106 may then cryptographically sign the activation records using the customer private key that is stored in the customer private key storage 107. The signed activation record may then be sent from the activation server 104 to the host 102 and in turn, from the host 102 to the lockdown module 109. In some embodiments, the customer private key storage 107 stores a plurality of customer private keys that includes a first customer private key used by the AP 108 to perform customer activation and a second customer private key used by the baseband 111 to perform customer activation. In this embodiment, the first customer private key is different from the second customer private key. In this embodiment, the cryptographic module 106 may cryptographically sign the activation records using the first customer private key and sign the activation tickets using the second customer private key.

The signed activation record may include a device certificate that certifies the device 101 as being authentic and may also include public keys used by the device 101. The device certificate may also include an activation ticket that provides information to the baseband regarding activation and registration on the cellular phone network. For instance, in a GSM network, the activation ticket may include the SIM policy, which provides information needed by the baseband 111 to communicate with a SIM card 112. In some embodiments, using the activation ticket, the baseband 111 is provisioned to communicate with particular cellular phone network carriers. In some embodiments, the cryptographic module 106, using the customer private key stored in the customer private key storage 107, also cryptographically signs the activation ticket included in the signed activation record. In the embodiments where a first customer private key is used by the AP 108 to perform customer activation and a second customer private key is used by the baseband 111 to perform customer activation, the cryptographic module 106 uses first customer private key to cryptographically sign the activation record and uses the second customer private key to cryptographically sign the activation ticket included in the signed activation record.

In one embodiment, when the lockdown module 109 receives the signed activation record including the signed activation ticket, the lockdown module 109 verifies the signed activation record to determine whether the signed activation record is valid. If the signed activation record is valid, the application processor 109 will perform customer activation. In some embodiments, the lockdown module 109 signals to the springboard to remove the lockout screen to allow the customer to use the device 101. The lockdown module 109 may then send the signed activation ticket included in the signed activation record the communication module 110 and, in turn, the communication module 110 may provide the signed activation ticket to the baseband 111.

In some embodiments, the baseband 111 verifies the signed activation ticket to determine if the signed activation ticket is valid. If the signed activation ticket is valid, the baseband 111 will perform customer activation. In some embodiments, the validation of the activation ticket by the baseband includes (i) performing RSA validation, (ii) checking the public key hashes, and (iii) ensuring that the activation ticket is valid for this device 101's baseband 111. In some embodiments, the baseband 111 checking the public key hashes includes the baseband 111 hashing the public key included in the activation ticket (i.e., contained in the certificate) and comparing this public key hash with the public key hashes included in the device 101's chain of trust. In some embodiments, the device 101 is provisioned with a set of public key hashes (chain of trust) during manufacturing that is deemed to be trustworthy. In some embodiments, ensuring that the activation ticket is valid for this baseband 111 includes comparing the serial number of the baseband 111 with the baseband serial number that is included in the activation ticket and comparing the IME1 or MEID of the baseband 111 with the baseband identifiers (IME1 or MEID) included in the activation ticket.

According to some embodiments, once the baseband 111 verifies that the signed activation ticket is valid, the baseband 111 trusts the signed activation ticket and activates according to the SIM policy included in the activation ticket. In some embodiments, the SIM card 112 contains its unique serial number (ICCID) and an internationally unique number of the mobile subscriber (IMSI). The IMSI includes the MCC (Mobile Country Code) and MNC (Mobile Network Cody), which is a carrier country combination. The SIM policy included in the activation ticket may delineate what ICCID are allowed and if the IMSI read from the SIM card 112 matches or falls within a range authorized by the activation ticket, the baseband 111 is able to function with the SIM card 112. In some embodiments, the activation tickets include parameters that control and restrict the behavior of the baseband 111 for networks and carriers that do not use a removable SIM card, such as CDMA networks. In this embodiment, the activation tickets include a Carrier ID field that contains the identification of the carriers that do not use SIM cards which may be used by the baseband 111. Accordingly, using these control parameters, the device 101 that do not include a SIM card 112 may also be customer activated. This method is called postponement because a decision as to which carrier the device 101 is associated is postponed until the moment of activation of the device 101.

Part II. Networked system to Securely Customer Activate and Factory Activate a Mobile Device According to Activation Records As discussed above, there was a need for a networked system that would allow the device to securely activate temporarily in the factory environment (i.e., factory activation) in order to be tested in the OQC stage.

Figure 2:
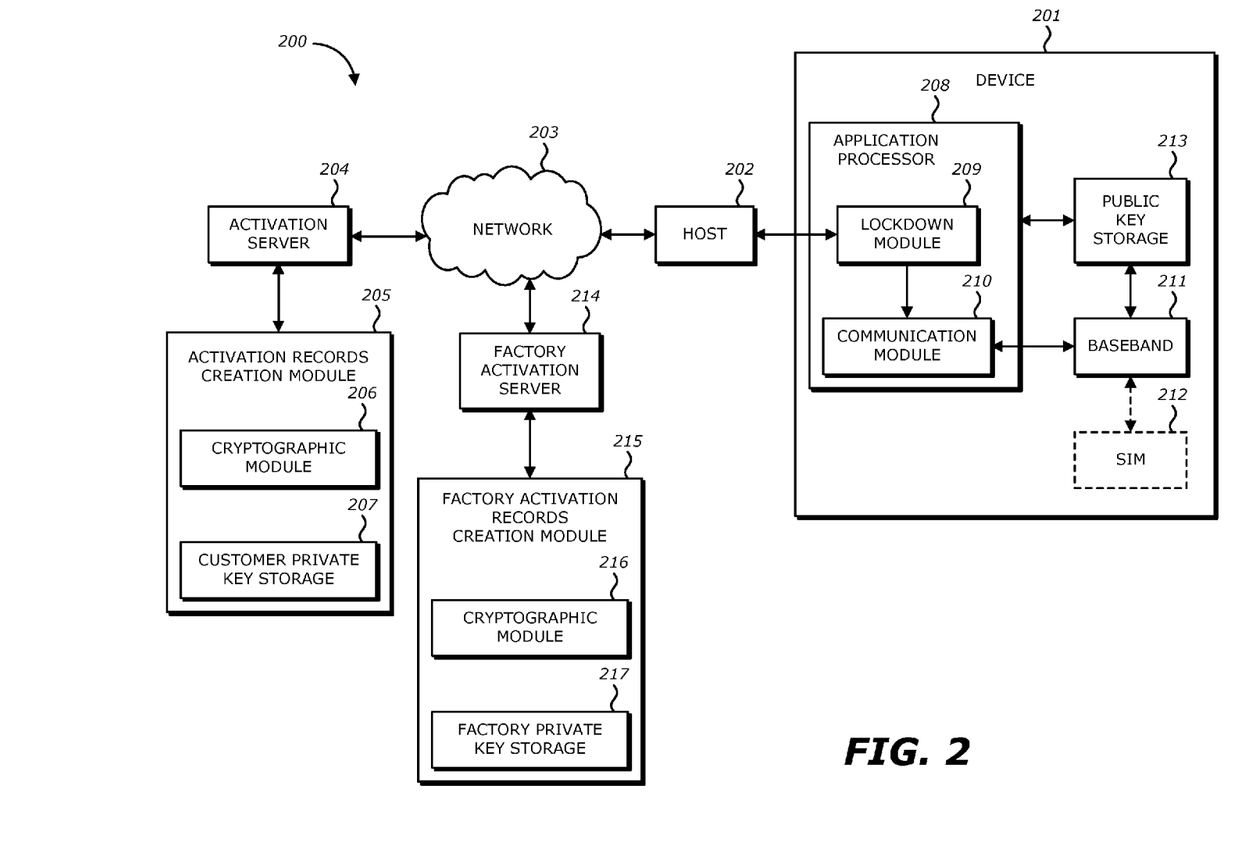
FIG. 2 shows a block diagram illustrating one embodiment of networked systems to securely customer activate and factory activate a mobile device according to authorized records.

FIG. 2 shows a block diagram illustrating one embodiment of a networked system 200 to authorize secure customer activation and factory activation of a mobile device 201 according to authorized records. This embodiment of the invention, as illustrated in FIG. 2, builds on the system 100 from FIG. 1.

According to some embodiments, in the factory environment, the device 201, via the host 202, communicates with a factory activation server 214 over the network 203. The factory activation server 214 may be coupled to a factory activation records creation module 215 which may include a cryptographic module 216 and a factory private key storage 217.

In some embodiments, the host 202 requests and receives activation information from the lockdown module 209. The host 202 sends the activation information to the factory activation server 214. The factory activation server 214 provides the activation information to the factory activation records creation module 215, which generates a factory activation record based on the activation information received. The cryptographic module 216 may then cryptographically sign the factory activation record using a factory private key that is stored in the factory private key storage 217. In some embodiments, the factory private key storage 217 stores a plurality of factory private keys that includes a first factory private key used by the AP 208 to perform factory activation and a second factory private key used by the baseband 211 to perform factory activation. In this embodiment, the first factory private key is different from the second factory private key. In this embodiment, the cryptographic module 216 may cryptographically sign the activation records using the first factory private key. The signed factory activation record may include a factory activation ticket and a factory certificate, which contains a factory public key. In the embodiments where a plurality of factory private keys are used, the factory activation record may include a plurality of factory public keys. In some embodiments, the cryptographic module 216 may also cryptographically sign the factory activation ticket using the factory private key. In the embodiments where a first factory private key is used by the AP 208 to perform factory activation and a second factory private key is used by the baseband 211 to perform factory activation, the cryptographic module 216 uses the second factory private key to cryptographically sign the factory activation ticket included in the signed factory activation record. In some embodiments, the factory private key is different from the customer private key stored in the customer private key storage 207 included in the activation records creation module 205.

The signed factory activation record may be sent from the factory activation server 214 to the host 202 and subsequently, the signed factory activation record may be sent from the host 202 to the lockdown module 209.

In some embodiments, the lockdown module 209 obtains a customer certificate and a factory certificate from the file server. The file server may be included in the public key storage 213. Accordingly, when the lockdown module 209 determines that the factory activation record includes a factory certificate that matches the factory certificate stored in the file server, the lockdown module 209 performs factory activation. Alternatively, in some embodiments, when the lockdown module 209 receives an activation record that includes a customer certificate that matches the customer certificate stored in the file server, the lockdown module 209 performs customer activation. In some embodiments, as discussed above, the activation record that includes a customer certificate may be sent from the activation server 204.

According to one embodiment, when the lockdown module 209 performs factory activation, the lockdown module 209 will only activate for a predetermined period of time. Accordingly, in some embodiments, the lockdown module 209 signals to the springboard (not illustrated) included in the AP 208 to remove the lockout screen and allow the device to be activated for the predetermined period of time in order for the OQC testing to be performed. At the end of that period of time, the lockdown module 209 will timeout and reboot the AP 208. In one embodiment, the predetermined period of time is determined by the minimum amount of time that is required to perform testing of the AP 208. In some embodiments, the predetermined period of time at which the lockdown module 209 will reboot is about eight (8) hours. According to some embodiments, this predetermined period of time can be dynamically set by the lockdown module 209 to accommodate the testing time that is required.

In some embodiments, once the lockdown module 209 determines that the signed factory activation ticket is valid, the lockdown module 209 sends the signed factory activation to the communication module 210. The communication module 210 may then send the signed factory activation ticket included in the factory activation record to the baseband 211. The baseband 211 may then verify that the factory activation ticket is valid. In some embodiments, similar to the customer activation ticket validation, the validation of the factory activation ticket by the baseband 211 includes (i) performing RSA validation, (ii) checking the public key hashes, and (iii) ensuring that the factory activation ticket is valid for this device 201's baseband 211.

According to one embodiment, during manufacturing, the baseband 211 is provisioned with a chain of trust, which is a set of public hashes that is trustworthy. During provisioning of the baseband 211, the baseband 211 is provided with a customer public key hash and a factory public key hash. Both the customer and factory public key hashes may be included in the chain of trust. In this embodiment, when verifying the factory activation ticket, the baseband 211 may hash the public key that is included in the factory activation ticket (i.e., in the factory certificate) and may compare this public key hash with the public key hashes included in the chain of trust. Accordingly, in this embodiment, if the hash of the public key included in the factory activation ticket matches the factory public key hash that was provisioned during manufacturing, the baseband 211 performs factory activation. Alternatively, in some embodiments, when the baseband 211 receives an activation ticket that includes a customer public key, the baseband 211 may hash the customer public key included in the activation ticket and compare that public key hash to the public hashes contained in the chain of trust. If the baseband 211 matches the hash of the customer public key to the customer public key hash that was provisioned during manufacturing, the baseband 211 performs customer activation.

In some embodiments, ensuring that the factory activation ticket is valid for this baseband 211 includes comparing the serial number of the baseband 211 with the baseband serial number that is included in the factory activation ticket and comparing the IME1 or MEID of the baseband 211 with the baseband identifiers (IME1 or MEID) included in the factory activation ticket. This method of ensuring that the factory activation ticket is valid for this baseband 211 in the factory activation scenario is similar to the method of ensuring that the activation ticket is valid for this baseband 211 in the customer activation situation, described above.

In some embodiments, when the baseband 211 performs factory activation, the baseband 211 registers onto the cellular telephone network for a set period of time. At the end of the set period of time, the baseband 211 will unregister from the network. The set period of time may be determined by the minimum amount of time that is required for testing of the device 201's telephony. In some embodiments, this set period of time is around forty-five (45) minutes. According to some embodiments, this set period of time can be dynamically set by the baseband 211 to accommodate the testing time that is required.

As illustrated in FIG. 2, the system 200 is efficient in that it allows for a mobile device 201 to be securely factory activated using the same OS that is used for customer activation. Therefore, during manufacturing, the factory line is streamlined because the shipping settings station only needs to load the customer OS onto all the devices including the devices that are being diverted to OQC station. Further, the system 200 also allows for securely factory activating devices that do and do not include a SIM card. In some embodiments, prototype mobile devices, which are being tested by engineers, may also employ the factory activation described in FIG. 2.

Part III. Methods of Securely Customer Activating and Factory Activating a Mobile Device According to Activation Records The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc. The processes are performed by processing logic that comprises hardware (e.g., circuitry, dedicated logic, etc.), software (such as is run on a general-purpose computer system or dedicated machine), or a combination of both.

Figure 3:
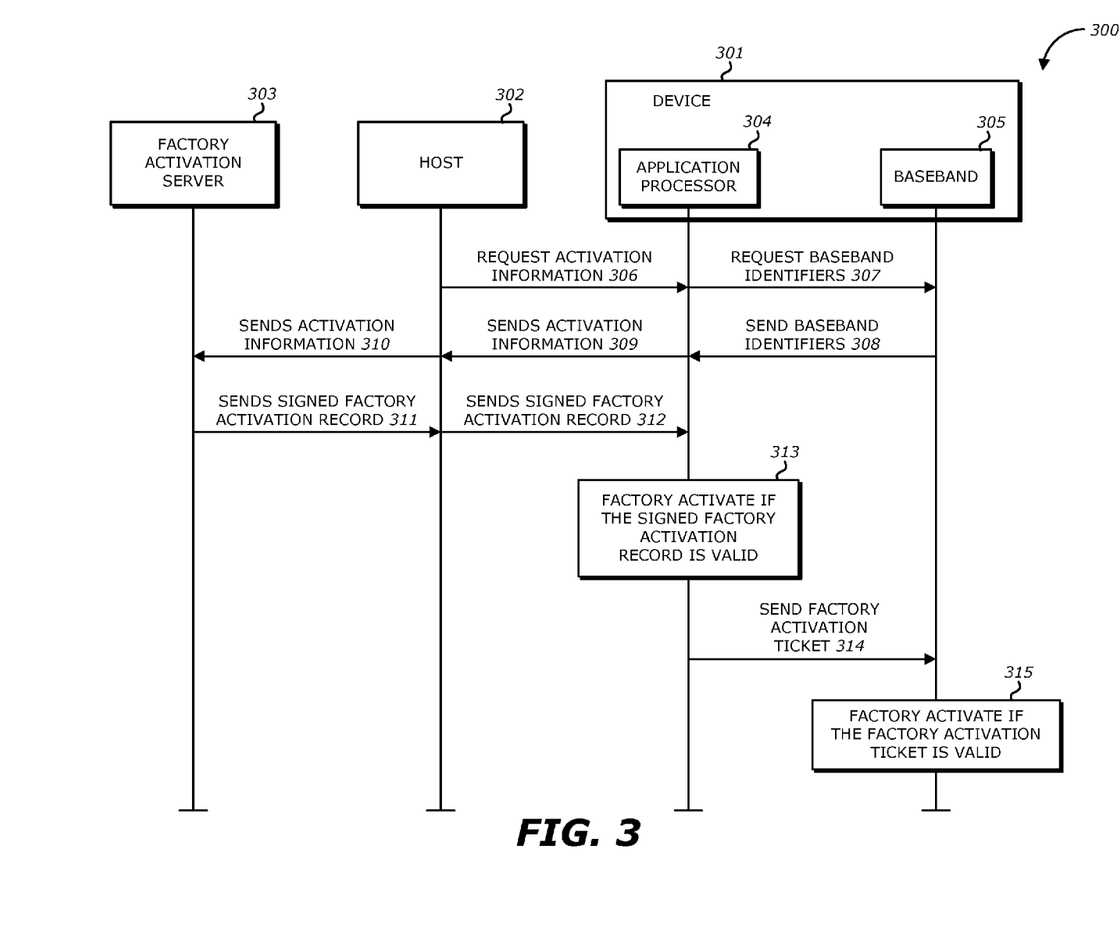
FIG. 3 shows a sequence diagram of one embodiment of method for securely factory activating a mobile device according to authorized records.

FIG. 3 shows a sequence diagram of one embodiment of method 300 for securely factory activating a mobile device 301 according to authorized records. As illustrated in FIG. 3, in one embodiment, the host 302 is coupled to the mobile device 301 and communicates with the factory activation server 303 on behalf of the mobile device 301. The mobile device 301 may include an application processor (AP) 304 and a baseband (BB) 305.

Method 300 begins with the host 302 requesting activation information from the AP 304 at sequence 306. In some embodiments, the activation information may include information on the mobile device 301 such as, for example, the mobile device 301's serial number and the mobile device 301's baseband identifiers. At sequence 307, the AP 304 may request baseband identifiers from the BB 305. In embodiments where the mobile device 301 includes a SIM card, the BB 305 may request baseband identifiers from the SIM card. At sequence 308, the BB 305 sends to the baseband identifiers to the AP 304. The AP 304 may then send the activation information to the host 302 at sequence 309 and at sequence 310, the host 302 sends the activation information to the factory activation server 303. The factory activation server 303 generates a signed factory activation record and sends the signed activation record to the host 302, at sequence 311. At sequence 312, the host 302 provides the signed activation record to the AP 304. At sequence 313, the AP 304 may factory activate if the signed factory activation record is valid and at sequence 314, the AP 304 may provide the factory activation ticket that is included in the factory activation record to the BB 305. At sequence 315, the BB 305 may factory activate if the factory activation ticket is valid.

Figure 4:
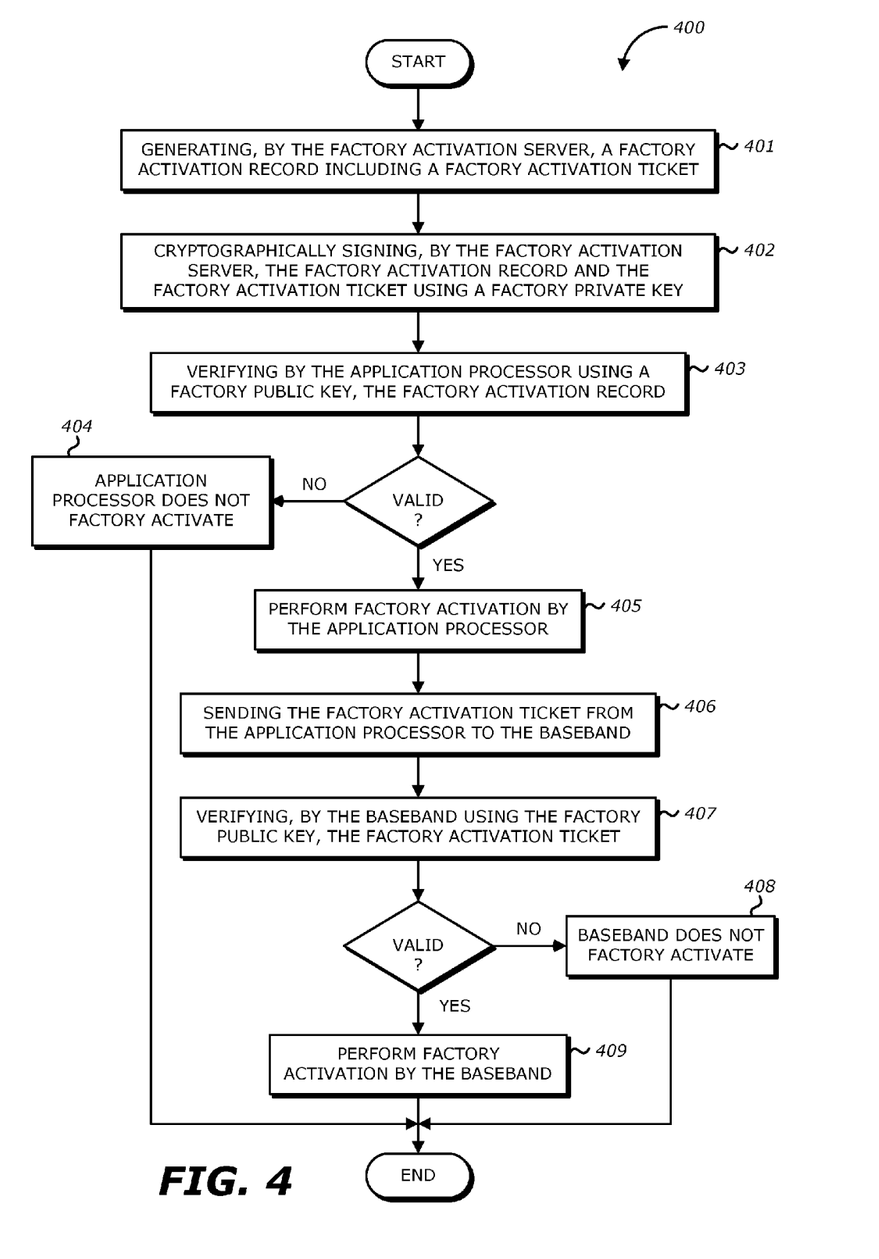
FIG. 4 shows a flow diagram of one embodiment of method for securely factory activating a mobile device according to authorized records.

FIG. 4 shows a flow diagram of one embodiment of a method 400 for securely factory activating a mobile device according to authorized records. For example, method 400 may be performed by the system 200 to factory activate the mobile device 201, as illustrated in FIG. 2.

Method 400 begins, at Block 401, with the factory activation server generating a factory activation record including a factory activation ticket. The factory activation server may be, for example, the factory activation server 214 in FIG. 2. The factory activation record is based on the activation information that is received from the device's application processor, which for example may be AP 208. In some embodiments, as discussed above, the activation information is provided by the lockdown module 209. At Block 402, the factory activation server may then cryptographically sign the factory activation record and the factory activation ticket using the factory private key. In some embodiments, the factory activation server may include a factory private key storage, which is illustrated, for example as element 217 in FIG. 2. This factory private key storage may store the factory private key therein. The factory activation server may then sends the signed factory activation record to the mobile device's application processor. At Block 403, the application processor verifies using the factory public key that the signed factory activation record received is valid. In some embodiments, the application processor verifies that the factory certificate included in the factory activation record matches the factory certificate that is stored in the file system. In some embodiments, the factory certificate includes the factory public key. The file system may be included in the mobile device. If the factory activation record is not determined to be valid, the application processor does not perform factory activation (Block 404). However, if the factory activation record is determined to be valid, the application processor may perform factory activation (Block 405).

In other embodiments, the file system also includes the customer certificate as well as the factory certificate. In this embodiment, when the application processor receives either an activation record or a factory activation record from the host, as described above in FIG. 2, the application processor may determine whether customer activation or factory activation is to be performed based on a whether the record received includes a factory certificate or a customer certificate.

The application processor performing factory activation at Block 405 may include the application processor activating to allow for factory testing and rebooting at a predetermined reboot time. As discussed above, the predetermined reboot time may be determined by the minimum amount of time that is required to complete testing of the application processor. In some embodiments, the predetermined reboot time is eight (8) hours. In other embodiments, the application processor may dynamically set the predetermined reboot time.

At Block 406, the application processor sends the factory activation ticket to the baseband included in the mobile device. At Block 407, the baseband verifies that the factory activation ticket is valid using the factory public key. In some embodiments, as discussed above, during manufacturing of the device, the baseband may be provisioned with a chain of trust. The chain of trust may include a set of public key hashes that are trustworthy. The public key hashes may include a customer public key hash and a factory public key hash. In some embodiments, the baseband hashes the factory public key included in the factory activation record and compares the factory public key hash obtained with the public key hashes in the chain of trust. If the factory public key hash obtained matches the factory public key hash in the chain of trust, the baseband may perform factory activation (Block 409). However, if the factory public key hash obtained does not match with the factory public key hash in the chain of trust, the baseband does not perform factory activation (Block 408).

In some embodiments, when the baseband receives either an activation record or a factory activation ticket from the application processor, as described above in FIG. 2, the baseband may determine whether customer activation or factory activation is to be performed based on a whether the ticket received includes a factory public key or a customer public key. As discussed above, the baseband hashes the public key and compares the hash of the public key contained in the ticket with the public key hashes included in the chain of trust. If the public key hash matches the customer public key hash in the chain of trust, the baseband may perform customer activation. Alternatively, if the public key hash matches the factory public key hash in the chain of trust, the baseband may perform factory activation.

Further, as above, when the baseband performs factory activation in Block 409, the baseband may register to a cellular telephone communications network and subsequently, unregister from the network after a predetermined unregistering time. In some embodiments, the predetermined unregistering time may be determined by the minimum amount to time that is required for the mobile device's telephony to be tested. In one embodiment, the predetermined unregistering time is forty-five (45) minutes. Accordingly, in this embodiment, the baseband may activate for forty-five minutes to allow for the OQC station to test the mobile device's telephony. In this embodiment, the device may be tested to ensure that it properly supports telephone calls made on the cellular network. In other embodiments, the baseband may dynamically set the predetermined unregistering time to accommodate the amount to testing time that is required.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hard-wired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of performing factory activation of a mobile device, the mobile device including an application processor and a wireless communications processor, the method comprising:

determining, by the application processor, that a record is a factory activation record received from a factory activation server, wherein the factory activation record is different from a customer activation record that is received from an activation server and that is signed using a first customer private key, wherein determining that the record is the factory activation record includes determining that the factory activation record is signed using a first factory private key, the first factory private key is different from the first customer private key;

performing factory activation by the application processor, wherein performing factory activation includes the application processor activating for factory testing and subsequently rebooting at a predetermined reboot time;

determining, by the wireless communications processor, that a ticket included in the record is a factory activation ticket, wherein the factory activation ticket is different from a customer activation ticket that is signed using a second customer private key, wherein determining that the ticket is the factory activation ticket includes determining that the factory activation ticket is signed using a second factory private key, the second customer private key is different from the second factory private key, wherein the factory activation ticket includes a baseband identifier and baseband serial number, wherein determining that the ticket is the factory activation ticket includes determining that the baseband identifier included in the factory activation ticket correspond to the wireless communications processor's baseband identifier and the baseband serial number included in the factory activation ticket corresponds to the wireless communications processor's baseband serial number; and performing factory activation by the wireless communications processor, wherein performing factory activation includes the wireless communications processor registering to a cellular telephone communications network for factory testing, and unregistering from the cellular telephone communications network after a predetermined unregistering time, wherein the first and the second customer private keys are stored in the activation server, and the first and the second factory private keys are stored in the factory activation server, and wherein the activation server and the factory activation server are separate from the mobile device.

2. The method of claim 1, wherein the predetermined reboot time is one of (i) about eight hours and (ii) dynamically set.

3. The method of claim 1, wherein the predetermined unregistering time is one of (i) around forty-five minutes and (ii) dynamically set.

4. The method of claim 1, wherein
the first customer private key is either (i) different from the second customer private key or (ii) identical to the second customer private key, and
the first factory private key is either (i) different from the second factory private key or (ii) identical to the second factory private key.

5. A method of performing factory activation of a mobile device, the mobile device including an application processor and a wireless communications processor, the method comprising:

generating, by a factory activation server, a factory activation record based on activation information received from the application processor, the factory activation record including a factory activation ticket, wherein the factory activation ticket includes a baseband identifier and baseband serial number;

cryptographically signing, by the factory activation server, (i) the factory activation record using a first factory private key, and (ii) the factory activation ticket using a second factory private key, the first and second factory private keys being stored in the factory activation server;

verifying, by the application processor, that the factory activation record received from the factory activation server is valid;

if the factory activation record is valid, performing factory activation by the application processor, wherein performing factory activation includes the application processor activating for factory testing, and rebooting at a predetermined reboot time;

sending the factory activation ticket from the application processor to the wireless communications processor;

verifying, by the wireless communications processor, that the factory activation ticket is valid, wherein verifying that the factory activation ticket is valid includes determining that the baseband identifier included in the factory activation ticket correspond to the wireless communications processor's baseband identifier and the baseband serial number included in the factory activation ticket corresponds to the wireless communications processor's baseband serial number; and if the factory activation ticket is valid, performing factory activation by the wireless communications processor, wherein performing factory activation includes the wireless communications processor registering to a cellular telephone communications network for factory testing, and unregistering from the cellular telephone communications network after a predetermined unregistering time, wherein the application processor and the wireless communications processor perform customer activation upon verifying an activation record including an activation ticket, the activation record being received from an activation server that stores a first customer private key and a second customer private key, wherein the activation server and the factory activation server are separate from the mobile device.

6. The method of claim 5, wherein the activation server, the activation record, the activation ticket, and the first and second customer private keys, respectively, are different from the factory activation server, the factory activation record, the factory activation ticket, and the first and second factory private keys.

7. The method of claim 5, wherein the predetermined reboot time is one of: (i) about eight hours and (ii) dynamically set.

8. The method of claim 5, wherein the predetermined unregistering time is one of (i) around forty-five minutes, and (ii) dynamically set.

9. The method of claim 5, wherein the factory activation record includes the factory activation ticket and a factory certificate, the factory certificate includes a plurality of factory public keys.

10. The method of claim 9, wherein verifying, by the application processor, that the factory activation record received from the factory activation server is valid comprises:

obtaining, by the application processor, a stored factory certificate from a file server included in the mobile device, and determining, by the application processor, that the factory certificate included in the factory activation record matches the stored factory certificate.

11. The method of claim 5, wherein, during manufacturing, the wireless communications processor is provisioned with a chain of trust, the chain of trust being a set of public key hashes that is trustworthy, wherein a customer public key hash and a factory public hey hash are included in the chain of trust.

12. The method of claim 11, wherein verifying, by the wireless communications processor, that the factory activation ticket is valid comprises:

performing RSA validation;

verify the public key hashes, wherein verifying the public key hashes includes:

hashing, by the wireless communications processor, a public key included in the factory activation ticket to obtain a hashed public key, comparing, by the wireless communications processor, the hashed public key with the set of public key hashes included in the chain of trust, and determining, by the wireless communications processor, that the factory activation ticket is valid if the hashed public key matches with the factory public key hash included in the chain of trust, wherein the one of the plurality of factory public keys is the public key included in the factory activation ticket.

13. The method of claim 5, wherein the first customer private key is either (i) different from the second customer private key or (ii) identical to the second customer private key, and the first factory private key is either (i) different from the second factory private key or (ii) identical to the second factory private key.

14. A system to perform factory activation of a mobile device, the system comprising:

a factory activation server coupled to a factory activation records creation module, the factory activation records creation module storing a first factory private key and a second factory private key; and the mobile device including an application processor and a wireless communications processor, wherein the application processor sends activation information to the factory activation server, the factory activation server provides the activation information to the factory activation records creation module, the factory activation records creation module generates a factory activation record based on the activation information, the factory activation record including a factory activation ticket, wherein the factory activation ticket includes a baseband identifier and baseband serial number, the application processor receives and verifies the factory activation record from the factory activation server, sends the factory activation ticket to the wireless communications processor when the factory activation record is valid, and performs factory activation when the factory activation record is valid, wherein performing factory activation includes the application processor activating for factory testing, and rebooting at a predetermined reboot time, the wireless communications processor receives and verifies the factory activation ticket, and performs factory activation when the factory activation ticket is valid, wherein verifying that the factory activation ticket is valid includes determining that the baseband identifier included in the factory activation ticket correspond to the wireless communications processor's baseband identifier and the baseband serial number included in the factory activation ticket corresponds to the wireless communications processor's baseband serial number, wherein performing factory activation includes the wireless communications processor registering to a cellular telephone communications network for factory testing, and unregistering from the cellular telephone communications network after a predetermined unregistering time, wherein the application processor and the wireless communications processor perform customer activation upon receiving an activation record including an activation ticket from an activation server that stores a first customer private key and a second customer private key, the activation record, the activation ticket, and the first and second customer private keys, respectively, being different from the factory activation record, the factory activation ticket, and the first and second factory private keys, wherein the activation server and the factory activation server are separate from the mobile device.

15. The system of claim 14, wherein the predetermined reboot time is one of (i) about eight hours and (ii) dynamically set.

16. The system of claim 14, wherein the predetermined unregistering time is one of: (i) around forty-five minutes, and (ii) dynamically set.

17. The system of claim 14, wherein the factory activation records creation module includes a cryptographic module and a factory private key storage to store the first and second factory private keys, wherein the cryptographic module cryptographically signs the factory activation record using the first factory private key and cryptographically signs the factory activation ticket using the second factory private key, wherein the first factory private key is different from the second factory private key.

18. The system of claim 17, wherein the signed factory activation record includes the factory activation ticket and a factory certificate, the factory certificate includes a plurality of factory public keys.

19. The system of claim 18, wherein
the application processor includes a lockdown module and a communication module,
wherein the application processor verifying the factory activation record comprises:
the lockdown module
receiving the signed factory activation record,
obtaining a stored factory certificate from a file server included in the mobile device, and
performing factory activation if the lockdown module determines that the factory certificate included in the signed factory activation record matches the stored factory certificate.

20. The system of claim 19, wherein the lockdown module performing factory activation comprises:
the lockdown module signaling to a springboard included in the application processor to remove a lockout screen and allow the mobile device to be activated for the predetermined period of time.

21. The system of claim 14, wherein, during manufacturing, the wireless communications processor is provisioned with a chain of trust, the chain of trust being a set of public key hashes that is trustworthy, wherein a customer public key hash and a factory public hey hash are included in the chain of trust.

22. The system of claim 21, the wireless communications processor verifying the factory activation ticket comprises:
the wireless communications processor performing RSA validation;
the wireless communications processor verifying the public key hashes, wherein the wireless communications processor verifying the public key hashes includes:
hashing a public key included in the factory activation ticket to obtain a hashed public key, and
comparing the hashed public key with the set of public key hashes included in the chain of trust,
wherein if the hashed public key matches with the factory public key hash included in the chain of trust, the wireless communications processor determines that the factory activation ticket is valid.

* * * * *